US009367060B2

(12) United States Patent
Shin et al.

(10) Patent No.: US 9,367,060 B2
(45) Date of Patent: Jun. 14, 2016

(54) INTELLIGENT OPTIMIZATION METHOD AND SYSTEM THEREFOR

(75) Inventors: Yung C. Shin, West Lafayette, IN (US); Cheol W. Lee, Birmingham, MI (US)

(73) Assignee: Purdue Research Foundation, West Lafayette, IN (US)

( * ) Notice: Subject to any disclaimer, the term of this patent is extended or adjusted under 35 U.S.C. 154(b) by 521 days.

(21) Appl. No.: 13/418,314

(22) Filed: Mar. 12, 2012

(65) Prior Publication Data

US 2012/0191235 A1 Jul. 26, 2012

Related U.S. Application Data

(63) Continuation-in-part of application No. 12/323,972, filed on Nov. 26, 2008, now abandoned.

(60) Provisional application No. 60/990,431, filed on Nov. 27, 2007.

(51) Int. Cl.

| | |
|---|---|
| *G05B 13/04* | (2006.01) |
| *G05B 17/02* | (2006.01) |
| *G06N 5/00* | (2006.01) |
| *G06Q 10/04* | (2012.01) |
| *G05B 13/02* | (2006.01) |
| *G06Q 10/06* | (2012.01) |

(52) U.S. Cl.
CPC .............. *G05B 17/02* (2013.01); *G05B 13/028* (2013.01); *G06N 5/003* (2013.01); *G06Q 10/04* (2013.01); *G06Q 10/067* (2013.01); *G05B 2219/35003* (2013.01); *G05B 2219/36253* (2013.01); *G05B 2219/45161* (2013.01); *G05B 2219/49065* (2013.01); *Y02P 90/265* (2015.11)

(58) Field of Classification Search
USPC ........................................................ 700/104
See application file for complete search history.

(56) References Cited

PUBLICATIONS

Y.C. Shin, C.W. Lee, T.J. Choi, S. Hu; "Intelligent Control Via Open Architecture Controller", School of Mechanical Engineering-Purdue University; Oct./Nov. 2000, Abrasives Magazine.
Cheol W. Lee, Yung C. Shin, "Modeling of Complex Manufacturing Processes by Hierarchical Fuzzy Basis Function Networks with Application to Grinding Processes", School of Mechanical Engineering-Purdue University, Transactions of the ASME, vol. 126, Dec. 2004.

(Continued)

*Primary Examiner* — Carlos Ortiz Rodriguez
(74) *Attorney, Agent, or Firm* — Hartman Global IP Law; Gary M. Hartman; Michael D. Winter

(57) ABSTRACT

A method and system of optimizing a complex manufacturing process performed to achieve one or more processing objectives for the process and/or a component produced by the process. The system includes a graphical user interface, a process module, and an optimization module. The process module includes a training module, an empirical relationships database, an analytical equations database, a heuristic knowledge database, and a process models database. The graphical user interface is used to input one or more processing variables and constraints for the processing objective. The training module generates empirical relationships from the processing variable and empirical data obtained from the manufacturing process. The process module generates a process model that takes into consideration heuristic knowledge of the manufacturing process, empirical relationships, and optionally analytical equations relating to the manufacturing process. The optimization module employs the process model to optimize the manufacturing process.

16 Claims, 18 Drawing Sheets

(56) References Cited

PUBLICATIONS

Cheol W. Lee and Yung C. Shin, "Evolutionary Modelling and Optimization of Grinding Processes", Int. J. Prod. Res., 2000, vol. 38, No. 12, 2787-2813.

Cheol W. Lee, Taejun Choi, Yung C. Shin, "Intelligent Model-based Optimization of the Surface Grinding Process for Heat-Treated 4140 Steel Alloys with Aluminum Oxide Grinding Wheels", Journal of Manufacturing Science and Engineering, Feb. 2003, vol. 125.

Cheol W. Lee, Yung C. Shin, "Construction of Fuzzy Systems Using Least-Square Method and Genetic Algorithm", Fuzzy Sets and Systems, 137, 2003, 297-323.

Table 1 Correlation Analysis of Grinding Parameters.

| Parameter | $\log a$ | $\log v_w$ | $\log v_s$ | $\log d_s$ | $\log(a \cdot d_s)$ | $\log \frac{v_w}{v_s}$ | $\log \frac{a}{d_s}$ | $\log \frac{v_w a}{v_s}$ |
|---|---|---|---|---|---|---|---|---|
| Correlation Coefficient | 0.82 | 0.78 | 0.75 | 0.75 | 0.88 | 0.67 | 0.68 | 0.96 |

FIG. 6

Table 2 Experimental conditions (Stanko 3G71 surface grinder).

| Effect | Variable | Level -2 | -1 | 0 | 1 | 2 |
|---|---|---|---|---|---|---|
| Work speed & downfeed | $a_d$ (μm) | 10 | | 20 | 35 | 50 |
| | $a$ (μm) | | 25 | 30 | 38 | 51 |
| | $v_w$ (m/s) | | 0.1 | 0.2 | 0.3 | |
| Crossfeed | $s_t$ (mm) | 0.5 | 1.0 | 1.5 | 2.0 | 2.3 |
| Dressing depth | $v_s$ (m/s) | | | 33 | | |
| | $d_s$ (mm) | | | 230 | | |
| Addition | $s_d$ (mm/rev) | | | 0.12 | | |

| No | $a_d$ (μm) | $a$ (μm) | $v_w$ (m/s) | $s$ (mm) |
|---|---|---|---|---|
| 1 | 0 | -2 | -1 | -1 |
| 2 | 0 | -1 | -1 | -1 |
| 3 | 0 | 1 | -1 | -1 |
| 4 | 0 | 2 | 1 | -1 |
| 5 | 0 | -2 | 1 | -1 |
| 6 | 0 | -1 | 1 | -1 |
| 7 | 0 | 1 | 1 | -1 |
| 8 | 0 | 2 | 1 | -1 |
| 9 | 0 | 0 | 0 | -2 |
| 10 | 0 | 0 | 0 | -1 |
| 11 | 0 | 0 | 0 | 0 |
| 12 | 0 | 0 | 0 | -1 |
| 13 | 0 | -2 | 1 | 2 |
| 14 | 1 | -2 | 1 | 2 |
| 15 | 1 | -2 | 1 | 0 |
| 16 | 2 | -2 | 1 | 2 |
| 17 | 2 | -2 | 1 | 0 |
| 18 | 2 | -2 | 1 | 2 |

FIG. 7

Table 3 Experimental conditions (Mazak CNC).

| Var | Level | | | | |
|---|---|---|---|---|---|
| | -2 | -1 | 0 | 1 | 2 |
| $a_d$ (μm) | 5 | 10 | 15 | 20 | 25 |
| $s_d$ (mm) | 0.05 | 0.1 | 0.15 | 0.2 | 0.25 |
| $a$ (μm) | 5 | 7.5 | 10 | 15 | 17.5 |
| $v_w$ (m/s) | | 0.05 | 0.07 | 0.09 | |
| $v_s$ (m/s) | | 18 | 22 | 27 | |
| $s_t$ (mm) | | 1 | 3 | 5 | |
| $d_s$ (mm) | Varies from 151 to 177 | | | | |

| No | $a_d$ | $s_d$ | $a$ | $v_w$ | $v_s$ | $s_t$ | Effect |
|---|---|---|---|---|---|---|---|
| 1 | -2 | 0 | 0 | 1 | 0 | 0 | |
| 2 | -1 | 0 | 0 | 1 | 0 | 0 | |
| 3 | -1 | 0 | 0 | 1 | 0 | 0 | |
| 4 | 0 | 0 | 0 | 1 | 0 | 0 | Dressing depth |
| 5 | 0 | 0 | 0 | 1 | 0 | 0 | |
| 6 | 1 | 0 | 0 | 1 | 0 | 0 | |
| 7 | 2 | 0 | 0 | 1 | 0 | 0 | |
| 8 | 0 | -2 | 0 | 1 | 0 | 0 | |
| 9 | 0 | -1 | 0 | 1 | 0 | 0 | |
| 10 | 0 | -1 | 0 | 1 | 0 | 0 | |
| 11 | 0 | 0 | 0 | 1 | 0 | 0 | Dressing lead |
| 12 | 0 | 0 | 0 | 1 | 0 | 0 | |
| 13 | 0 | 1 | 0 | 1 | 0 | 0 | |
| 14 | 0 | 2 | 0 | 1 | 0 | 0 | |
| 15 | 0 | 0 | -2 | 0 | 0 | 0 | |
| 16 | 0 | 0 | -1 | 0 | 0 | 0 | |
| 17 | 0 | 0 | 0 | 0 | 0 | 0 | Downfeed |
| 18 | 0 | 0 | 0 | 0 | 0 | 0 | |
| 19 | 0 | 0 | 1 | 0 | 0 | 0 | |
| 20 | 0 | 0 | 2 | 0 | 0 | 0 | |
| 21 | 0 | 0 | 0 | -1 | 0 | 0 | |
| 22 | 0 | 0 | 0 | -1 | 1 | 0 | |
| 23 | 0 | 0 | 0 | 0 | -1 | 0 | Wheel speed, work speed, & crossfeed |
| 24 | 0 | 0 | 0 | 0 | 0 | 1 | |
| 25 | 0 | 0 | 0 | 1 | -1 | -1 | |
| 26 | 0 | 0 | 0 | 1 | 0 | 0 | |

FIG. 8

Table 4: Optimal input variable values minimizing grinding cost

| Operation | Design variable | Value | Constraints |
|---|---|---|---|
| Roughing | $v_w$ (m/s) | 0.30 | [0.1, 0.3]* |
| | $s_f$ (mm) | 1.86 | [0.5, 2.3] |
| | $a_{cr}$ (μm) | 50.8 | [12.7, 50.8] |
| | $a_r$ (μm) | 17.6 | [10, 46] |
| | $n_r$ | 5 | N/A |
| | $N_d$ | 37 | N/A |
| Finishing | $v_w$ (m/s) | 0.30 | [0.1, 0.3] |
| | $s_f$ (mm) | 2.30 | [0.5, 2.3] |
| | $a_{cr}$ (μm) | 15.4 | [12.7, 50.8] |
| | $a_r$ (μm) | 12.4 | [10, 46] |
| | $n_r$ | 5 | 5 (fixed) |
| | $N_d$ | 48 | N/A |

FIG. 11

Table 5: Optimization results for the minimization of grinding cost

| Operation | Process output | Expected value | Constraint | Grinding cost ($/pc) | Total cost ($/pc) |
|---|---|---|---|---|---|
| Roughing | $P_c(1)$ (W) | 331 | ≤400 | 0.65 | 1.20 |
|  | $P_c(N_d)$ (W) | 400 | ≤400 |  |  |
|  | G | 73.3 | ≥40 |  |  |
| Finishing | $P_d(1)$ (μm) | 0.60 | ≤0.6 | 0.55 |  |
|  | $\sigma(1)$ (MPa) | 309 | ≤400 |  |  |
|  | $\sigma(N_d)$ (MPa) | 400 | ≤400 |  |  |
|  | G | 1010 | ≥40 |  |  |

FIG. 12

Table 6: Grinding Conditions Used

| Grinding conditions | Case I | Case II | Case III |
|---|---|---|---|
| Wheel diameter | | 50 mm | |
| Work diameter | | 70 mm | |
| Wheel speed | | 37 m/s (fixed) | |
| Work speed | | 0.533 m/s (fixed) | |
| Programmed infeed rate 1 | | [0.002 – 0.035 mm/s] | |
| Programmed infeed rate 2 | | [0.002 – 0.035 mm/s] | |
| Dressing depth | | 0.025 mm (fixed) | |
| Dressing lead | | [0.01 – 0.5 mm] | |
| Grinding width | | 9 mm (fixed) | |
| Time constant | | 14 (fixed) | |
| Grinding ratio | | 15.8 (fixed) | |
| Max surface roughness | | 3.7 μm | |
| Max out-of-roundness | | 3.6 μm | |
| Total radial size reduction | | 0.25 mm | |

FIG. 14

Table 7 Comparison of operating conditions after optimization.

| Design Variable | Case I | Case II | Case III |
|---|---|---|---|
| Programmed infeed rate 1 | 0.0218 | 0.0149 | 0.035 |
| Programmed infeed rate 2 | 0.0050 | 0.0149 | 0.035 |
| Dressing lead | 0.073 | 0.130 | 0.046 |

FIG. 15

Table 8 Comparison of process conditions.

| Process Condition | | Case I | Case II | Case III |
|---|---|---|---|---|
| Grinding power, W | Roughing | 2329 | 1654 | 3282 |
| | Finishing | 1289 | 1671 | 3289 |
| | Spark-out | 423 | 280 | 473 |
| Surface roughness, $\mu m$ | | 0.7 | 0.7 | 0.63 |
| Out-of-roundness, $\mu m$ | | 0.6 | 0.35 | 0.60 |

FIG. 16

Table 9 Comparison of cycle time.

| Cycle Time | Case I | Case II | Case III |
|---|---|---|---|
| Roughing time | 10.73 | 5.00 | 6.10 |
| Finishing time | 3.11 | 11.78 | 1.04 |
| Spark-out time | 2.92 | 4.69 | 5.08 |
| Total cycle Time | 16.77 | 21.47 | 12.22 |

FIG. 17

INTELLIGENT OPTIMIZATION METHOD AND SYSTEM THEREFOR

CROSS REFERENCE TO RELATED APPLICATIONS

This is a continuation-in-part patent application of co-pending U.S. patent application Ser. No. 12/323,972, filed Nov. 26, 2008, which claims the benefit of U.S. Provisional Application No. 60/990,431, filed Nov. 27, 2007. The contents of these prior applications are incorporated herein by reference.

BACKGROUND OF THE INVENTION

The present invention generally relates to methods and systems for optimizing complex manufacturing processes, such as grinding processes, to achieve various objectives, such as cost minimization, productivity maximization, and process control.

Grinding is one of the most complex and least understood machining processes, due to a large number of characteristic variables that not only influence the process outcome, but also each other. Although extensive research has been performed to describe grinding processes, the models proposed to date can be only partially defined, are applicable to a limited range of processes, or are not suitable for industrial practice. Therefore, in industry, the prevailing methods for designing grinding processes have relied on prior experience and handbooks, and most often grinding operations are performed under less than optimal conditions due to the difficulties in integrating all the information obtained from various sources to determine desirable grinding conditions.

Thus, more systematic approaches have been sought to minimize cost and/or maximize productivity. In recent years, great efforts have been made to develop intelligent methodologies to address these needs. Rowe et al., Application of Intelligent CNC in Grinding, Comput. Ind., 31, 45-60 (1996), and Rowe et al., Application of Artificial Intelligence in Grinding. Ann. CIRP, 43, 521-531 (1994), provided an extensive review on diverse applications of artificial intelligence (AI) to grinding processes, and categorized them by the underlying techniques: knowledge-based expert systems, fuzzy logic, neural networks, genetic algorithms (GAs), and adaptive control for optimization (ACO).

Knowledge-based expert systems in grinding normally use a knowledge base that is based on human experts and production rules, and they provide a solution through an inference procedure, for example, on desirable grinding conditions for a given grinding situation or on selection of a grinding wheel. These approaches, however, have limitations. The basic premise is that most of knowledge needed must exist in the form of heuristic rules, which are often limited. Different types of knowledge, which are available in the form of mathematical equations and experimental data, cannot be incorporated into the existing knowledge-based expert systems. Furthermore, the number of experts is limited and even decreasing due to system automation and rapid changes in the manufacturing industry, and thus accumulating knowledge and experience will be more difficult in the future. Most knowledge-based expert systems do not offer the flexibility needed for requisite frequent updates to cope with continual introduction of new materials and processes.

Due to its inherent capability of handling uncertainty and flexibility, fuzzy logic has also been applied to grinding optimization problems. Since expert knowledge and production rules can be expressed in the form of if-then rules and then easily converted to fuzzy rules, fuzzy logic-based schemes can maintain the benefits of the simple rule-based systems while being able to manage the possible imprecision or vagueness of obtained knowledge. The prior art has proposed methodologies of incorporating mathematical models and empirical data into a fuzzy logic-based optimization scheme via an automatic rule generation mechanism.

Another approach to the optimization of grinding processes has been artificial neural networks (ANN). ANN-based methods usually focus on modeling the process rather than optimization. Neural networks have a good learning ability from data and have proven their excellent performance for poorly understood problems, such as many grinding applications. However, ANN-based approaches are applicable only where abundant training data are available and its usage has often been limited by the difficulties of finding sufficient reliable training data to cover the entire domain of interest.

In addition to the efforts made on modeling grinding processes, much research has been also carried out to improve the optimization algorithm itself for grinding processes. Such efforts have included the review if various grinding optimization approaches and categorizing them into simple data retrieval methods, empirical model methods, rule-based reasoning, case-based reasoning, ANN-based methods, and hybrid methods. It has also been shown that an optimization scheme could be incorporated into an adaptive control system to provide initial optimal grinding conditions for the adaptive control. In most research, traditional optimization techniques have been applied to grinding processes, but mainly developed for a specific process or application.

In recent years, evolutionary algorithms (EA) and their adaptations have become popular means for the optimization of grinding processes since these methods generally have the capability of finding the global optimum in the presence of several local optima and perform better for ill-defined problems, which are difficult to solve by conventional algorithms. There are mainly three branches of EAs: GAs (genetic algorithms), evolutionary strategies (ES), and evolutionary programming (EP). Among them, GA has been mostly frequently used to optimize grinding processes.

As mentioned above, single representation approaches such as production rules, ANN, analytical models or empirical models have their own limitations in describing the grinding processes. To overcome these shortcomings, a more comprehensive hybrid approach would be required that is capable of describing complex grinding processes. By incorporating different knowledge, Lee et al., Evolutionary Modeling and Optimization of Grinding Processes, Int. J. Prod. Res., 38, 2787-2813 (2000), hereinafter Lee (2000), proposed a Generalized Intelligent Grinding Advisory System (GIGAS), which was a model-based optimization system applicable to a general class of grinding processes. Analytical models formulated in generalized form as well as empirical models were used to describe grinding processes. A Fuzzy Basis Function Network (FBFN) with an autonomous learning algorithm was also employed due to its capability of incorporating experimental data and heuristic knowledge in a unified fashion. The developed ES-based optimization algorithm provided a fast convergence to optimal points and was demonstrated as a good tool for the optimization of ill-defined problems or difficult problems, such as constrained non-linear optimization problems with mixed-discrete variables. Subsequent to Lee (2000), Wang et al., Prediction of Surface Roughness in Cylindrical Traverse Grinding Based on ALS Algorithm, Proceedings of the Fourth International Conference on Machine Learning and Cybernetics, Guangzhou (Aug. 18-21, 2005), similarly reports the use of an algorithm developed for FBFN to model surface roughness in cylindrical grinding processes.

Notwithstanding the advancements provided by Lee (2000) and Wang et al., there is an ongoing need for optimization algorithms or utilities capable of optimizing complex grinding processes to achieve various objectives, such as cost minimization, productivity maximization, and process control.

BRIEF DESCRIPTION OF THE INVENTION

The present invention generally provides a method for model-based optimization of complex problems with constraints, such as encountered when attempting to optimize complex manufacturing processes such as various forms of grinding. The method utilizes heterogeneous domains of information existing in the forms of analytical equations, data, and heuristic knowledge, and performs optimization for various objective functions. The method employs a soft computing technique for optimization and a self-learning scheme of unknown nonlinear systems. The method is capable of handling mixed integer problems, i.e., both continuous and discrete variables, at the same time while satisfying all the constraints imposed thereon. Therefore, the method provides the capability of providing guaranteed global optimal solutions for many different types of optimization problems.

This invention provides the capabilities of learning from experimental data and combining them with mathematical models. In addition, the invention provides a computationally efficient and guaranteed optimal solution for mixed integer optimization problems with constraints. The technology also allows for learning of complex systems by means of an autonomous learning approach and using them in the optimization.

Other objects and advantages of this invention will be better appreciated from the following detailed descriptions.

BRIEF DESCRIPTION OF THE DRAWINGS

FIG. 6 contains Table 1 that provides a correlation analysis of grinding parameters used in a first investigation of the optimization approach of the present invention.

FIG. 7 contains Table 2, which identifies surface grinder conditions used in the first investigation of the optimization approach.

FIG. 8 contains Table 3, which identifies CNC machining conditions used in a second investigation of the optimization approach of the present invention.

FIG. 11 contains Table 4, which summarizes optimal values for grinding input parameters used in the first investigation.

FIG. 12 contains Table 5, which summarizes optimization results for process output parameters and grinding costs obtained with the first investigation.

FIG. 14 contains Table 6, which summarizes values for grinding input parameters used in three different case scenarios examined by the second investigation of the optimization approach.

FIGS. 15, 16 and 17 contain Tables 7, 8 and 9, respectively, which compare calculated operating conditions, estimated process conditions, and predicted cycle times, respectively, obtained with the second investigation.

DETAILED DESCRIPTION OF THE INVENTION

Figure 1:
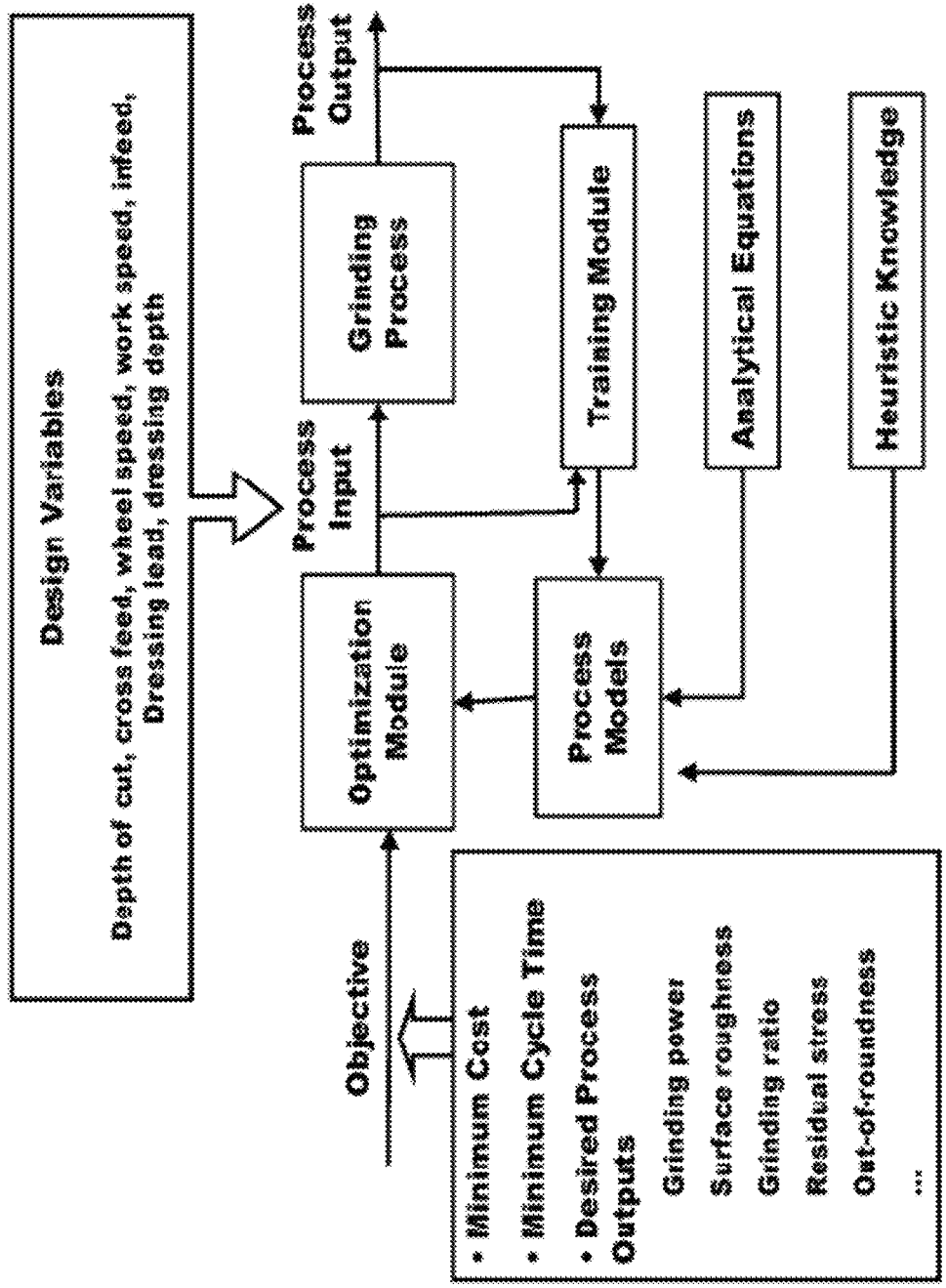
FIG. 1 is a flow chart representing a generalized optimization approach utilized by embodiments of the present invention.

The present invention utilizes the Generalized Intelligent Grinding Advisory System (GIGAS) proposed by Lee (2000), supra, in a methodology applicable to grinding processes to achieve objectives identified by a user. FIG. 1 is a flow chart representing GIGAS used in a model-based optimization approach in which objectives of a grinding process are used as inputs to an optimization module. FIG. 1 includes a nonlimiting list of potential objectives, such as manufacturing cost-related considerations (costs, cycle times, etc.) as well as requirements more directly related to the final article produced by the grinding process (grinding power, surface roughness, grinding ratio, residual stress, out-of-roundness, etc.). One or more objectives can be used as inputs to the optimization module as process constraints, a notable example of which would be the required final surface roughness for the article.

As evident from FIG. 1, the optimization approach also uses process models as inputs to the optimization module. The process models are represented in FIG. 1 as being constructed by incorporating three knowledge representation methods, each in the form of an empirical model. As represented in FIG. 1, a first of these knowledge representation methods is established by a training module using experimental data, a second is established by analytical equations, and the third is established by heuristic knowledge extracted from production rules or expert knowledge. The optimization approach of this invention preferably utilizes all three empirical models. Based on the knowledge established with these empirical models, the optimization module performs a search for global optimal conditions that will minimize a prescribed objective within the constraints that were entered for the objective. The structure of GIGAS represented in FIG. 1 is sufficiently generalized to be able to handle various grinding processes and optimization objectives beyond those identified in FIG. 1.

The following discussion will make reference to the following nomenclature.

a=individual at each population
a=downfeed (mm)
$a_d$=dressing depth (μm)
$a_r$, $a_f$=downfeed in roughing and finishing stage (μm)
$a_t$=truing depth (mm)

$a_w$=total thickness of work ground off (μm)
b=grinding width (mm)
$b_e$=extra cross-travel (mm)
$b_s$=grinding wheel width (mm)
$b_w$=width of workpiece (mm)
$C_d$=cost of a dressing tool (US$)
$C_s$=cost of grinding wheel per unit usable volume (US$/mm³)
$c_z$=constant for the depth of burn model
d=set of discrete variables
$d_s$=wheel diameter (mm)
$d_w$=work diameter (mm)
e'''=energy input to the workpiece per unit area ($10^{-3}$ J/mm²)
$F_0$, $f_i$=coefficients for force model (I=1, 2, ... )
$F'_t$=specific tangential grinding force (N/mm)
$F'_{t,0}$=initial specific tangential grinding force after dressing (N/mm)
G=grinding ratio
$G_1$, g=coefficients for grinding ratio model
$h_{eq}$=equivalent chip thickness (μm)
j=part number
k=thermal conductivity of the workpiece (W/m·K)
$l_c$=grinding zone contact length (mm)
$L_e$=extra length of table travel (mm)
$L_w$=length of workpiece (mm)
M=cost per hour of labor and administration (US$/h)
$n_d$, $n_x$=number of discrete and continuous variables
$N_d$=dressing interval, number of parts ground between redressings
$n_g$=number of constraints regarding output variables
$N_{td}$=total number of dressing operations during life of dressing tool
P=grinding power (W)
P*= maximum allowable grinding power (W)
r=out-of-roundness (mm)
$r_0$=coefficient for out-of-roundness model
$R_0$, $r_i$=coefficients for surface roughness model (l=1, 2, ... )
Ra=surface roughness (μm)
$R_{a,0}$=initial surface roughness right after dressing (μm)
s=control parameters for discrete variables
s=radial depth of cut at each grinding stage (mm)
$s_d$=dressing lead (mm/rev)
$s_f$=cross-feed (mm)
T=total thickness to remove in each operation (mm)
$t_d$=time to true and dress the wheel (min)
u=programmed in-feed rate (mm/s)
$u_{ch}$=specific chip formation energy (J/mm³)
$u_g$=specific grinding energy (J/mm³)
u*=critical specific grinding energy generating grinding burn (J/mm³)
v=actual in-feed rate (mm/s)
$v_s$=wheel speed (m/s)
$v_t$=traverse speed of grinding wheel (mm/s)
$v_w$=work speed (m/s)
x=set of continuous variables
y=process model
$V'_w$=accumulated specific material removal (mm²)
α=thermal diffusivity of the workpiece (mm²/s)
$θ_{mb}$=critical temperature causing onset of burning (° C.)
ξ=control parameters for continuous variables
σ=maximum residual stress (MPa)
$σ*_r$=maximum allowable residual stress (MPa)

Process Modeling

Analytical models or empirical models have been commonly used to simulate process outputs used to optimize a process. However, many existing grinding models are designed for specific applications and materials with a limited range of operating conditions, such that they may not be applicable or may require modifications with a significant amount of effort when a process setup is different or operating conditions are different from those used for the model development. This situation invokes a need for generalized grinding models, which have the same basic structure for each process condition regardless of specific application or setup.

Figure 2:
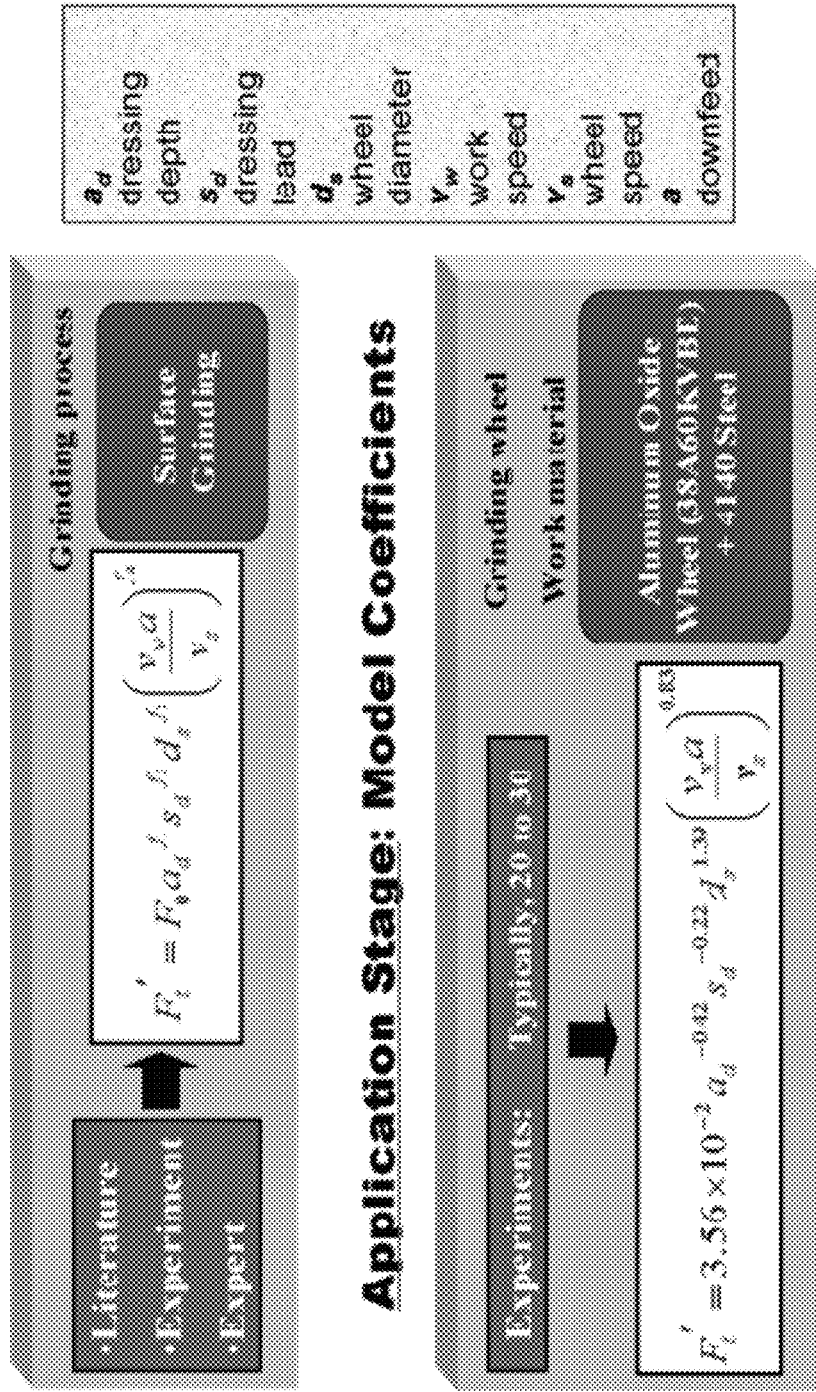
FIG. 2 represents an approach utilized by embodiments of the present invention to develop an analytical model for use in the optimization approach of FIG. 1.

Generalized grinding models adapted by the present invention were developed on the basis that such models could be reduced to basic common forms. Once model structures are defined, model development becomes a task of determining model coefficients, which can be accomplished with a small number of experiments. As an example, FIG. 2 represents a procedure for developing an analytical model, in this case, a tangential force model for surface grinding. For surface grinding processes, important parameters affecting a process condition (such as tangential force) can be identified from literature survey, experimental analysis, and expert knowledge, and a generic model form can be determined with more extensive analysis. After constructing a model form, only a small number (e.g., twenty to thirty) of experiments are typically required to determine the model coefficients for each combination of grinding wheel and work material of interest. However, several grinding process conditions, such as temperature and residual stress, are more difficult to formulate as generalized grinding models, and thus this approach alone is not sufficient to describe grinding processes.

When analytical models are not available or inadequate, either a FBFN or radial basis function network (RBFN) model can be used to model the process with empirical data and heuristic knowledge. Theoretical background for this approach is described in Lee et al., Fuzzy Basis Function Networks of Hierarchical Structure for Modeling Manufacturing Processes, Proceedings of the 1998 ASME IMECE, DSC 64, ASME, p. 767-775 (1998), hereinafter Lee (1998). Information regarding the relationships between input (x) and output (d) variables can be given as:

$$d=f(x)+e=\Sigma p_i(x)w_i+e=Pw+e$$

Hence, it can be seen that it becomes a linear least-square problem. For constructing a RBFN, the response matrix P is determined such that the column vectors are response vectors of the RBF nodes. The RBF node has a bell-shape and is described with the non-linear parameter sets including the center vectors (m) and the width vector (σ). Similarly, the response matrix P is represented as the FBFs for modeling a FBFN. If the Gaussian membership function is used for the FBFs, the problem again becomes determining the non-linear parameter sets including the center vectors (m) and the width vector (σ). Additional details regarding this technique can be appreciated from Lee et al., Generalized Intelligent Grinding Advisory System, International Journal of Production Research, Vol. 45, No. 8, p. 1899-1932 (April 2007), hereinafter Lee (2007).

One of the notable advantages of the algorithm proposed by Lee (1998) is the autonomous learning capability of model structure and parameters. One of the problems associated with training neural networks is that it requires a large number of training data and the suitable model structure must be determined by many iterative trials. The orthogonal least-square learning using genetic algorithm (OLSGA) proposed by Lee (1998), however, offers the procedure of constructing an optimal FBFN or RBFN through autonomous learning of model structure and parameter tuning. Therefore, feeding the input and output data to the network is all that is required as it learns the underlying input-output relationship autonomously, which makes it attractive for industrial applications.

Figure 3:
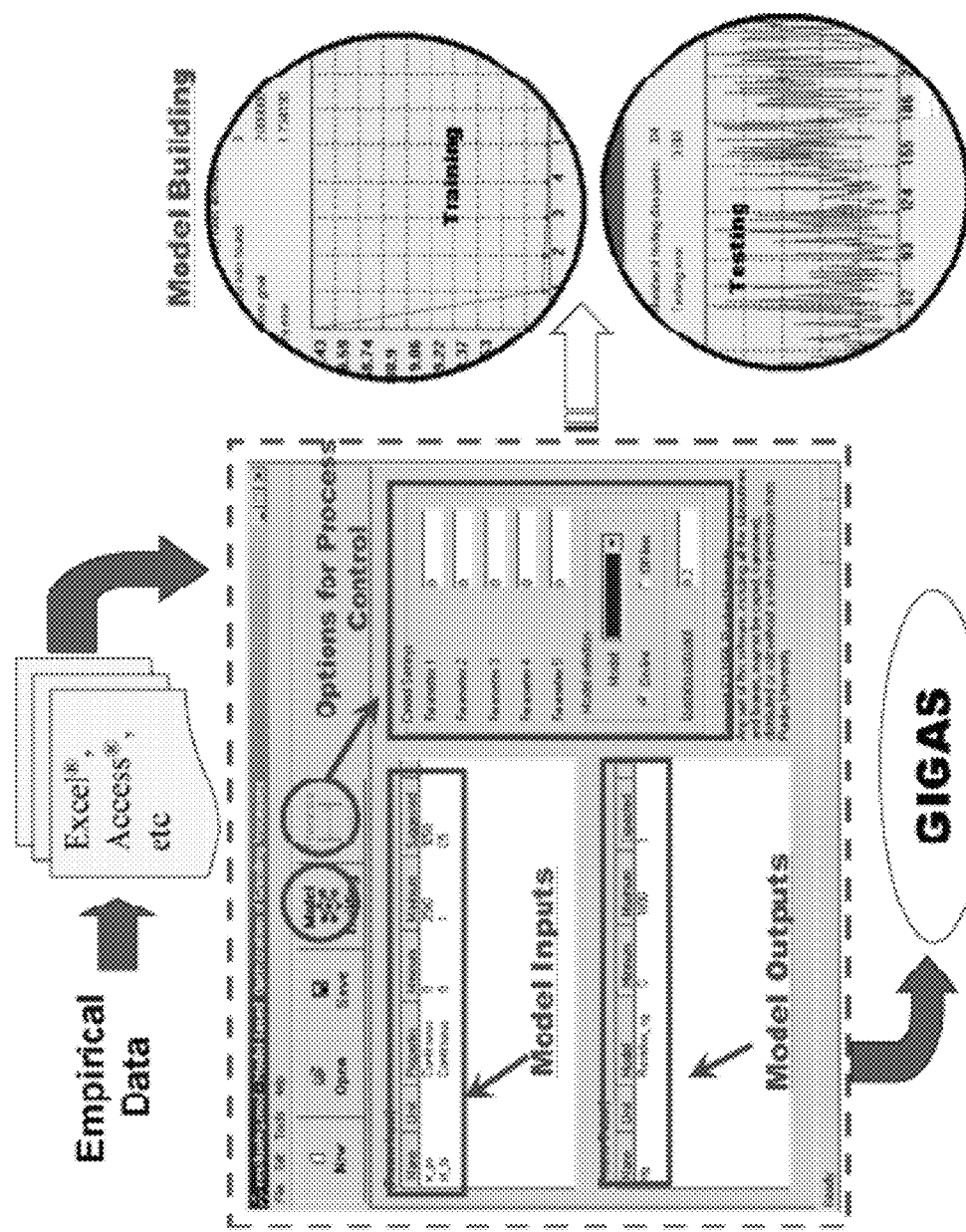
FIG. 3 represents the manner in which Windows®-based modeling software can be utilized by embodiments of the present invention.

In arriving at the present invention, a Windows®-based software was developed for modeling the FBFN and RBFN and incorporated into the GIGAS. As represented in FIG. 3, such software can allow for importing various formats of experimental data, such as EXCEL®, ASCII, DBASE and ACCESS®, and provide autonomous training of RBFN or FBFN with a graphical display of the training status. The parameters of trained RBFN or FBFN can then stored in the database to form empirical models (FIG. 1). In addition, heuristic rules of FIG. 1 can be represented as the fuzzy rules and then incorporated into the FBFN models.

Problem Formulation

The following is a description of variables that would typically be defined for the purpose of formulating a grinding process and the inputs to its objectives.

Input variables (x,d), which refers to variables that can be manipulated.

$$x=(x_1,x_2,\ldots,x_{n_x})^\tau \in \Re^{n_x}$$

Continuous variables include, for example, in-feed rate, cross-feed rate, work/wheel speed, dressing parameters, etc.

$$d=(d_1,d_2,\ldots,d_{n_d})^\tau \in Z^{n_d}$$

Discrete variables with meaningful metrics, for example, grinding wheel diameter, mesh size, dressing interval, etc.

Output variables (y), which refer to variables that can be measured or estimated:

$$y=(y_1,y_2,\ldots,y_m)^\tau$$

for example, surface roughness, grinding force, grinding power, residual stress, out-of-roundness, temperature, etc.

It is assumed here that the relationships between input and output variables are determined by process models and can be represented by:

$$y_j=y_j(x,d), j=1,2,\ldots,m$$

The optimization problem of the grinding process can then be formulated as follows:

$$\min J=f[x,d;y(x,d)]$$

subject to:

Inequality constraints regarding input variables (or operating ranges):

$$x_l(i) \leq x_i \leq x_u(i), i=1,\ldots,n_x$$

$$d_j \in \{d_j(1),d_j(2),\ldots,d_j(n_j)\}, j=1,\ldots,n_d$$

Inequality constraints regarding output variables:

$$g_i[y(x,d)] \geq 0, i=1,\ldots,n_g$$

A grinding wheel becomes dull without redressing, and as such the process conditions (outputs) such as grinding force and surface roughness will change with grinding time, which has not been considered in most previous grinding optimization approaches. Because grinding wheels are typically redressed after grinding multiple workpieces, to satisfy constraints for all grinding cycles between redressing intervals, inequality constraints regarding output variables are preferably changed as follows:

$$g_i[y(x,d,j)] \geq 0, i=1,\ldots,n_g, j=1,\ldots,N_d$$

Incorporating the above constraints, however, results in an optimization problem that is too complex to solve even with the most advanced optimization algorithms. By considering the fact that process outputs such as force and roughness are monotonously changing over the grinding time, the above constraints can be greatly simplified. For example, if the grinding power P increases monotonously with grinding time, it can be shown that the following two constraints on the grinding power are equivalent:

$$P(k) \leq P^*,$$

$$k=1,\ldots,N_d$$

$$\Leftrightarrow P(N_d) \leq P^*$$

GIGAS Structure

Figure 4:
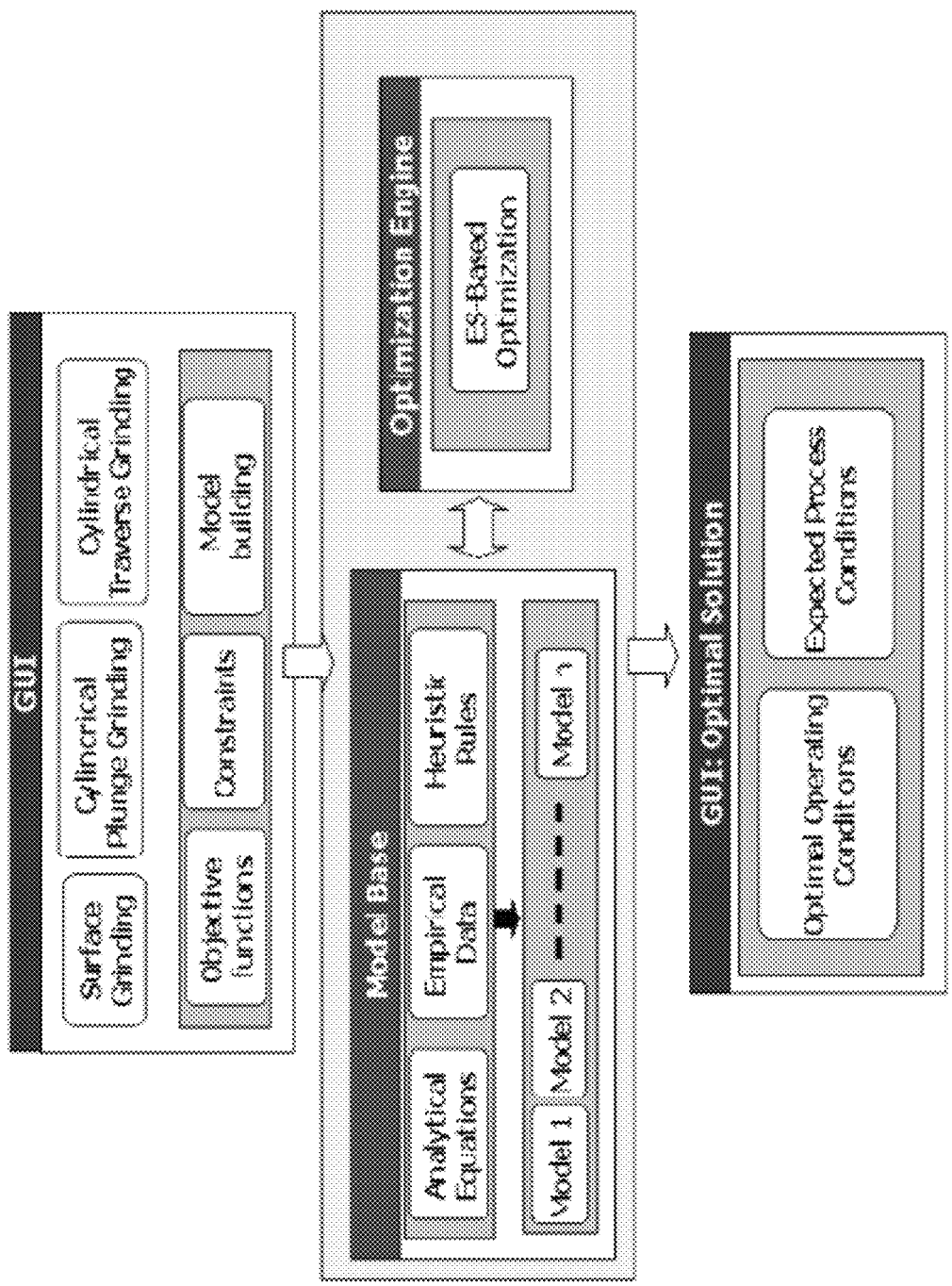
FIG. 4 is a flow chart representing structures of the GIGAS system utilized by embodiments of the present invention.

An existing embodiment of the invention utilizes GIGAS having three major components: an optimization engine, a model database, and a graphical user interface, which are represented in FIG. 4. The optimization engine itself is preferably independent of its applications, i.e. processes, objective functions and process models, which allows for the capability of generalizing various optimization problems. While the GIGAS technique of the present invention is particularly intended to support certain grinding processes, for example, surface grinding, cylindrical plunge-grinding and cylindrical traverse grinding processes, it can be easily expanded to other grinding processes, for example, centerless grinding and internal grinding.

In order to handle a constrained optimization problem with mixed-discrete variables, the present invention proposes an extended ES algorithm by combining standard ES techniques and specialized ES for integer variables. A detailed description on the ES-based algorithm is given in Lee (2000), whose disclosure relating to ES-based algorithms is incorporated herein by reference, and therefore will not be described in any detail here.

Figure 5:
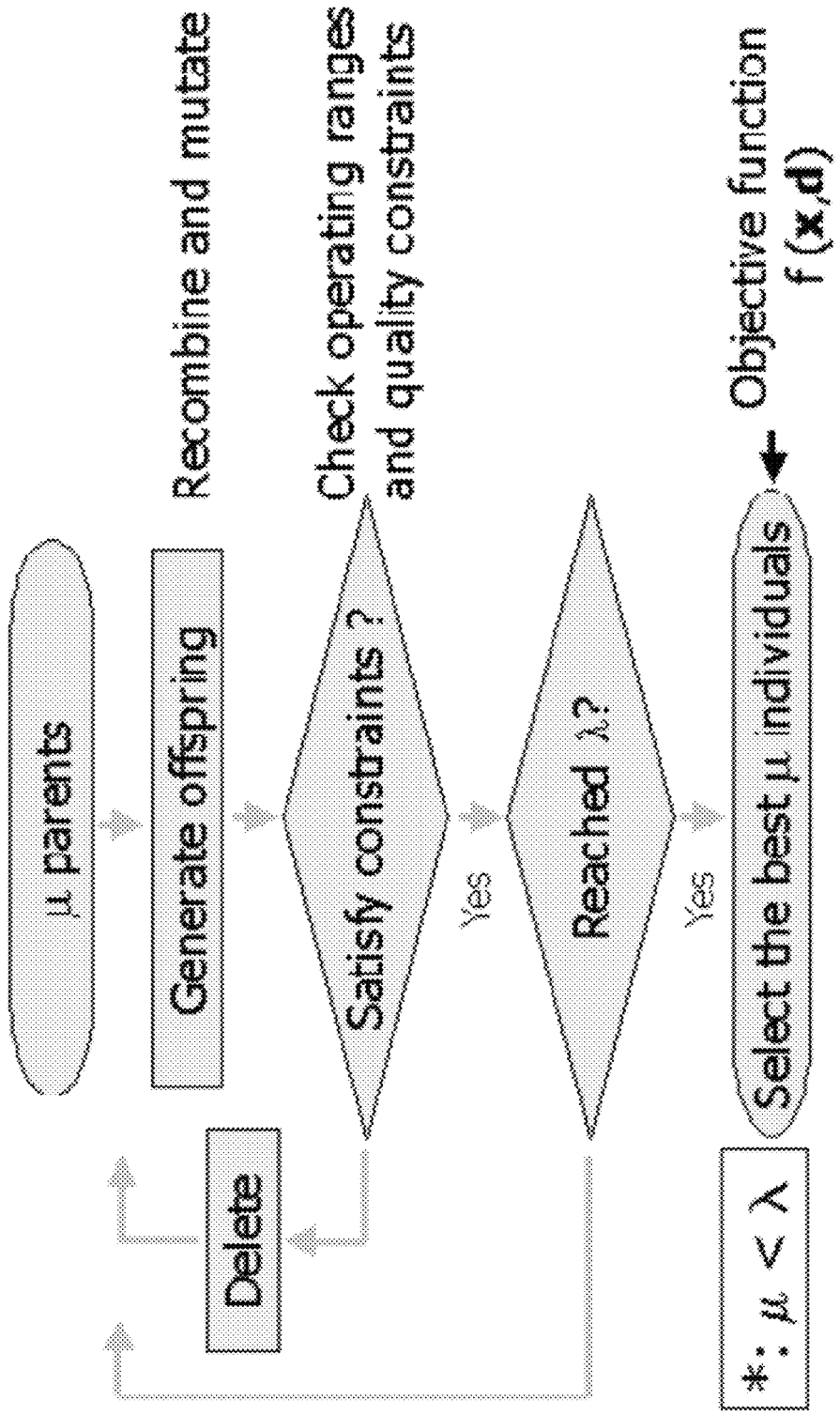
FIG. 5 is a flow chart representing the generation of an optimization strategy for use in the optimization approach of the present invention.

One embodiment of the present invention adopted a multi-membered ES approach, $(\mu,\lambda)$-ES, where the $\mu$ individuals out of $\lambda$ offsprings are chosen to form the parents of the next generation. At the first generation, the parent population of individuals is generated randomly and their objective function values are evaluated. At the following generation, recombination and mutation operators are applied repeatedly until the number of offspring satisfying the constraints reaches $\lambda$. The offspring population of $\lambda$ is then evaluated by the objective function and the best $\mu$ individuals among $\lambda$ offsprings are selected for the parents of the next generation. The algorithm is terminated when a stopping condition is met, which is given by a predefined maximum number of generations. The overall procedure is represented in FIG. 5.

An individual at each population is represented by design variables and their control parameters for managing mutation operation as follows:

$$a=(x,d,\xi,s) \in \Re^{n_s} \times Z_+^{n_d} \times \Re_+^{n_s} \times Z_+$$

The control parameter space $\Re^{n_s} \times Z_+$ contains $n_x$ standard deviations $(\xi_1,\ldots,\xi_{n_x})$ for the normally distributed mutation of continuous variables $x_j$'s and a step size s for the geometric distribution of discrete variable $d_j$'s. The mutation operator provides a way of accomplishing a stochastic search so that the algorithm can find a global optimum. The continuous variable x and discrete variable d are coupled with their own control variables and embedded in an individual together. However, the mutation and recombination are performed separately at the same step.

To manage the constraints, an individual is generated and tested against the constraints. If all the constraints are satisfied, the individual is added in the offspring pool. Otherwise, the individual is discarded and the previous steps are repeated until an acceptable individual is generated. This discarding method is employed due to its simplicity of implementation although it may require a longer computational time due to the wasted steps in producing unacceptable individuals. Consequently, the development and implementation of other techniques for this step are foreseeable.

An existing embodiment of the invention currently utilizes two types of databases in GIGAS. The first is a machine database, which contains the names of commercially-available grinding machines and their operating constraints, such as maximum machine power, maximum feed, maximum workable size, etc. These constraints are automatically checked when a user defines the operating ranges for a particular machine. The second database is a process model database where available process models are defined and their model coefficients for each wheel and work material combination are stored. The existing embodiment of the invention currently supports three types of models, including analytical models, FBFN models for heuristic rules and empirical data, and RBFN models to represent empirical relationships.

A suitable graphical user interface (GUI) for use with the invention can be implemented with Windows®-based software developed using Visual C++. Using the graphical user interface, after the above-noted machine and process model databases are constructed, a user can start a new optimization task or open an existing task by making a proper selection, such as grinding process, grinding machine, grinding wheel, and work material, where lists for the selection can be generated from the database. Based on the user selection, relevant information can be retrieved from the database and imported into the user input GUI. The GUI then preferably prompts the user to input operating ranges of the design variables, process constraints, and values of the parameters for the particular optimization objective(s). By combining the user input and model coefficients obtained from the database, optimization can be performed with very short computational time by the optimization engine.

Optimization of Surface Grinding Process

The following represents an example of a procedure that was carried out with GIGAS to optimize a surface grinding process in accordance with an embodiment of the invention.

The grinding process was performed on a Stanko 3G71 surface grinder with a horizontal spindle and a Mazak CNC machining center with a vertical spindle. Grinding specimens were prepared by heat treating 4140 steel blocks to Rockwell hardness 50. Aluminum oxide grinding wheels (38A60K5VBE) were used. A Tayor-Hobson Surtronic 3+ profilometer was used to measure the surface roughnesses of the resulting ground surface. Grinding forces were measured using a three-axis Kistler 9257B dynamometer with a Kistler 5004 dual mode amplifier and transferred to a computer through a data acquisition system. Residual stresses in the specimens were measured by using an X-ray diffraction technique on a Siemens Diffraktometer D-500 using chromium (Cr) radiation. A total of 156 degrees of nominal peak position ($2\theta$) and four inclinations ($\psi$) were used. Multiple measurements in depth were performed and the profile of residual stresses was obtained by removing the material with a chemical etching process. Maximum residual stresses were determined by fitting the curve of the profile.

For use in the following experiments, a more generalized model form for grinding force was developed and shown to be more accurate for both roughing and finishing operations in comparison to a generalized process model proposed by Lee et al., Intelligent Model-based Optimization of the Surface Grinding Process for Heat-Treated 4140 Steel Alloys with Aluminum Oxide Grinding Wheels," Transactions ASME, Journal of Manufacturing Science and Engineering, Vol. 125 p. 65-76 (2003), hereinafter Lee (2203). To find a generalized model form of grinding force, an extensive literature survey was performed and common variables among those models were identified as significant parameters affecting grinding force, which can be summarized as follows:

Single variables $a_d$, $s_d$, $v_w$, $v_s$, $d_s$, a
Product of variables $a \cdot d_s$
Ratio of variables $a/d_s$, $v_w/v_s$
Mixed form $v_w \cdot a/v_s$ The number of parameters is preferably reduced to have a more simplified and condensed form, which can be done by inspecting the significance of parameters. A correlation analysis using a commercially available software package with actual experimental data contained in Tables 2 and 3 of FIGS. 7 and 8 was performed to identify the significance of parameters. Higher correlation coefficients between the log of specific grinding force and the parameters implied the corresponding significant parameters. As summarized in Table 1 of FIG. 6, the last parameter, $v_w a/v_s$, showed the highest correlation coefficient value and was determined to be the most significant parameter. Considering the combinations among the wheel speed ($v_s$), work speed ($v_w$), depth of cut (a) and wheel diameter ($d_s$), the equivalent chip thickness and the wheel diameter were chosen as model parameters while avoiding the redundancy of the variables. Therefore, the generalized grinding force model was given as follows:

$$F'_{t,0} = F_0 a_d^{f_1} s_d^{f_2} d_s^{f_3} (v_w a/v_s)^{f_4}$$

Eighteen sets of grinding experiments covering roughing conditions were performed on the Stanko 3G71 surface grinder and twenty-six sets of grinding experiments covering finishing conditions were carried out on the Mazak CNC machine for the analysis with the grinding conditions shown in Tables 2 and 3, respectively. Even though a systematic design of experiment (DOE) method was not applied, a DOE method could be considered to reduce the number of experiments or examine the significance of the parameters.

Many existing grinding force models have been developed and tested for certain applications, grinding wheels, and work materials. To evaluate the general applicability of the invention, the form was again tested against the data generated from the existing grinding force models. The data were generated from the existing models and then the proposed model form was fitted to the data. As the performance indicator, $R^2$ values were determined to determine the fitness of the model. With the data generated from four existing models, the proposed model form could be fitted with high $R^2$ values, thus proving its general applicability.

The generalized surface roughness model used in the investigation for surface grinding processes is given by Lee (2003) as follows:

$$R_{a,0} = R_0 s^{r_1}_d a^{r_2}_d (v_w/v_s)^{r_3} (s_c/b_s)^{r_4}$$

It has been observed that a traverse motion in the surface grinding affects the workpiece surface, and therefore the ratio of the cross-feed over the wheel width was considered as an additional parameter. The proposed model form was tested against the existing models. With the data generated from the existing models, the proposed model was fitted with high $R^2$ values, thus proving its validity of the model structure.

The grinding ratio is defined by the ratio of the accumulated metal removal to the accumulated lost volume of wheel. The following relationship between the G-ratio and the equivalent grinding thickness is known in the prior art:

$$G = G_1 h^{-g}_{eq} = G_1 (v_w a/v_s)^{-g}$$

High temperature in grinding can lead to thermally-induced tensile residual stresses on the ground surface. High tensile stresses are known to reduce the fatigue life of ground parts significantly, and a linear relationship has been shown to exist between the maximum surface temperature and the maximum residual stress. In addition, a correlation has been shown to exist between the energy entering a workpiece during grinding and the grinding parameters. Lee (2003) adopted the energy input to the workpiece and the cross-feed as significant factors affecting residual stress. The distribution of residual stresses after grinding depends on various parameters. While residual stresses are characterized by their distributions, only the maximum magnitude values of residual stresses are considered here. On this basis, the following empirical model was proposed for use in the investigation.

$$\sigma_r = \sigma_0 e^{\prime\prime\alpha}(s_f/b_s)^\beta$$

$$e^{\prime\prime} = F^\prime_t v_s / v_w$$

Figure 9:
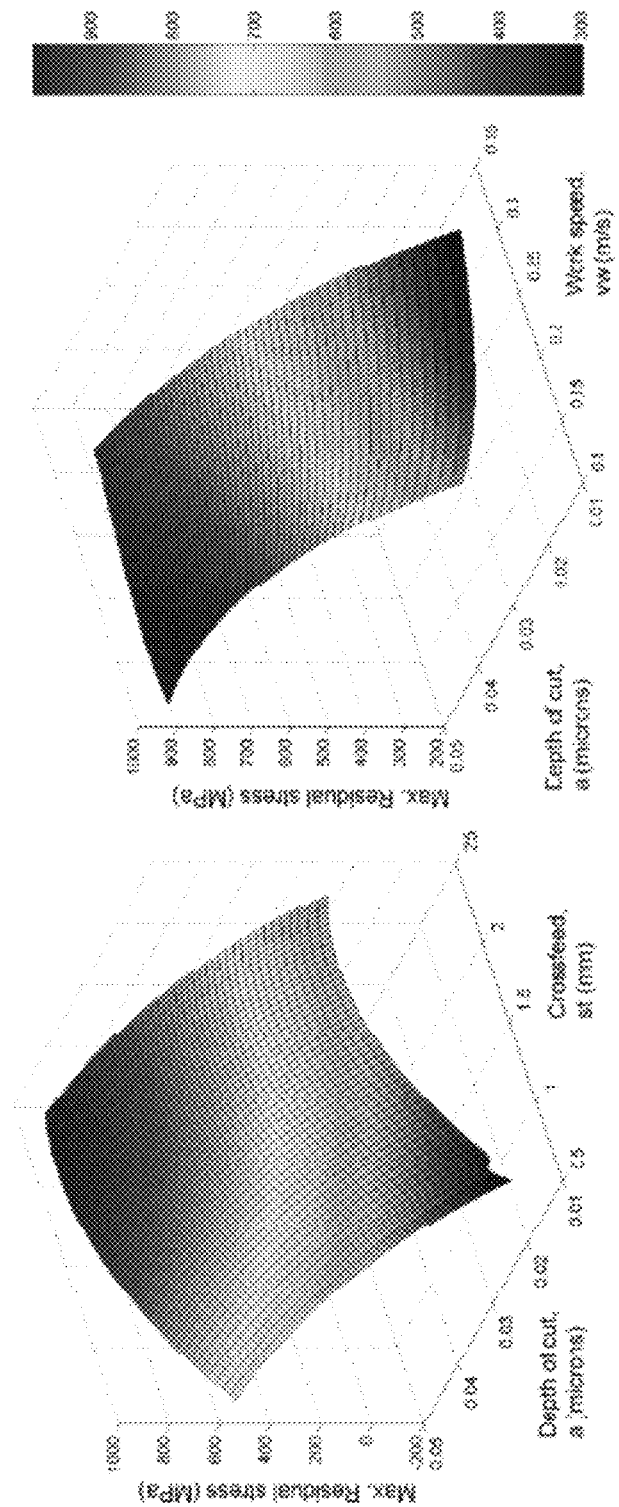
FIG. 9 represents an FBFN maximum residual stress model used in the first investigation of the optimization approach.

However, the residual stress model did not show a good prediction capability, probably due to the inadequate model structure as well as the complexity associated with residual stress. As an alternative model, a residual stress model using a FBFN was adopted. Since a large set of training data was not available, the FBFN was initially trained to learn the model structure in rough form with fuzzy rule sets extracted from the analytical model given in the two equations immediately above, and then further trained using a small number of additional experimental data. The trained FBFN model provides the residual stresses in terms of important parameters set forth in FIG. 9.

The grinding models proposed in the previous sections can be used to predict process condition values immediately after dressing. However, because the grinding process gradually changes due to the wheel-dulling effect, the time-varying characteristics of the grinding process were considered. Lee (2003) verified that surface roughness initially increases or decreases and then converges to a constant value for all dressing conditions. As such, variation of surface roughness can be modeled as follows:

$$R_a = R_{a,0}(1 + r_5 \cdot V^\prime_w{}^{f6})$$

Similarly, variation of the tangential force against the accumulated specific metal removal, $V^\prime_w$ (mm$^2$) can be modeled by the following equation:

$$F^\prime_t = F^\prime_{t,0}(1 + f_5 \cdot V^\prime_w{}^{f6})$$

Figure 10:
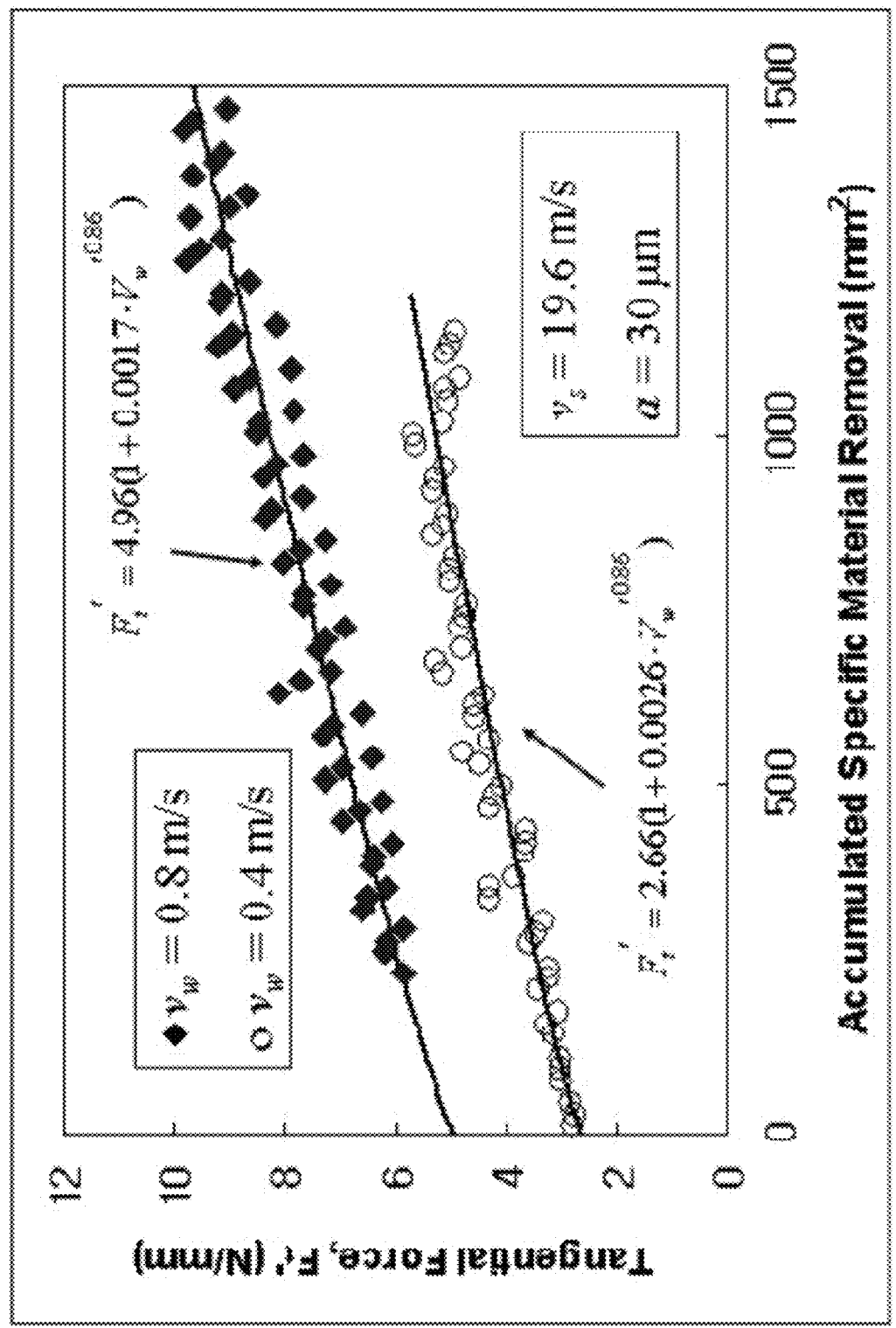
FIG. 10 represents an example of a model fitting result of tangential force versus accumulated specific metal removal used in the first investigation.

FIG. 10 is an example of a model fitting result obtained with the above equation plotting variation of specific tangential force against accumulated material removal.

In the investigation, three different optimization objectives for the minimization of grinding cost, minimization of cycle time, and process design were considered for surface grinding processes. The equation for calculating the grinding cost per piece, C(US$/pc), is given as follows:

C=(machining cost)=(dressing cost)=(wheel cost due to wear)

The cycle time per piece $t_m$ (min/pc) is given by the sum of machining time and dressing time as $t_m$=(machining time)=(dressing time)

For minimization of cycle time, the total cycle time for roughing and finishing was considered as the objective function.

Another objective of optimization is process design, where optimization finds operating conditions to achieve desirable values of process outputs. For instance, if desirable surface roughness, grinding power, and grinding ratio need to be achieved at the same time, the objective function can be given by the weighted sum of normalized errors. Weighting factors are employed to rank the importance of process conditions in such cases when all of the desired process conditions cannot be achieved due to constraints.

The optimization was subject to several constraints. For the roughing operation, the constraints on the grinding process included the maximum grinding power allowed and the minimum grinding ratio. Since the grinding power increases with grinding time after dressing, the grinding power constraint can be satisfied for all $N_d$ workpieces if the grinding power for the last workpiece, right before redressing, satisfies the power constraint. For the finishing operation, the constraints for the product quality requirements are considered such as the maximum surface roughness allowed, the maximum residual stress allowed, and the minimum grinding ratio.

There are constraints associated with the allowable ranges of operating parameters for both the roughing and finishing operations as follows:

$$v_{w,l} \leq v_w \leq v_{w,u}$$

$$d_{d,l} \leq s t \leq s_{t,l}$$

$$a_{d,l} \leq a_d \leq a_{d,u}$$

$$a_l \leq a \leq a_u$$

where l and u are, respectively, lower and upper limits of each variable. Optimal operating conditions are determined within these permissible ranges for a given machine.

In the investigation, the optimization task was performed to minimize grinding cost. Due to modification in the process models and introduction of additional experiments on the Mazak CNC machine, a slight change in optimization results was expected. It was assumed that a roughing operation is first applied to remove a stock from the workpiece, and then a finishing operation is carried out to satisfy given surface quality requirements.

Figure 13:
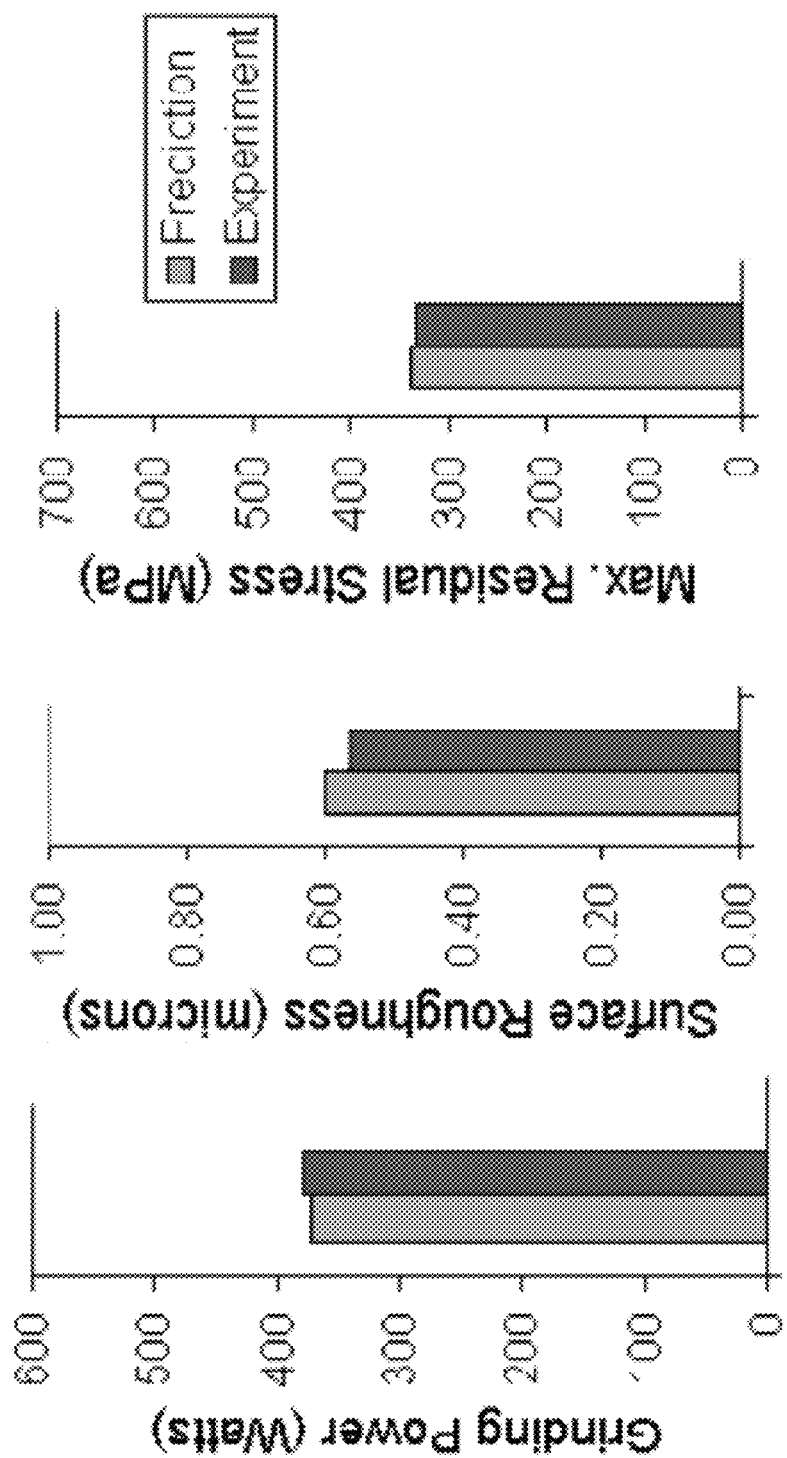
FIG. 13 contains a bar graph comparing predicted and experimental optimal process conditions for the first investigation.

The optimization algorithm based on the ES was applied to the above optimization problem using the models described above. The optimal values of grinding parameters are shown in Table 4 of FIG. 11, while the predicted values of process output and grinding costs are shown in Table 5 of FIG. 12 along with the constraints used. From these results, it can be seen that the optimal condition for a minimum grinding cost was achieved without violating any constraint. In addition, dressing intervals for both roughing and finishing conditions were chosen such that it does not exceed any of the constraint values. Values predicted by the investigation for grinding power, surface roughness, and maximum residual stress are compared in FIG. 13 to experimental validation of achieved optimal process conditions reported in Lee (2003).

Optimization of Cylindrical Plunge-Grinding Process

The following discusses a second investigation carried out with GIGAS to optimize a cylindrical plunge-grinding process in accordance with an embodiment of the invention.

A grinding force model for cylindrical plunge-grinding was obtained by modifying the model described above for surface grinding processes. Between the surface grinding and cylindrical plunge-grinding, the corresponding specific material removal rates can be defined as follows:

$$v_w a = \pi \cdot d_w v$$

The wheel diameter was replaced with an equivalent wheel diameter $d_{eq}$ and the equivalent chip thickness term was also replaced by using the above equation since this process has continuous in-feed instead of fixed depth of cut. Consistent with the model described above for surface grinding processes, the grinding force model was written as:

$$F'_{t,0}=F_0 a_d^{f_1} s_d^{f_2} d_{eq}^{f_3}(\pi \cdot d_w v/v_s)^{f_4}$$

$$d_{eq}=d_s d_w/(d_w \pm d_s)$$

$$F'_t=F'_{t,0}(1+f_5 \cdot V'^{f_6}_w)$$

$$P=F'_t(v_s \pm v_w)b$$

where the signs in the denominator in the second equation correspond to external grinding and internal grinding respectively, and the signs in the fourth equation correspond to climb-cut and down-cut, respectively. The time-varying characteristics of the grinding force are represented by a power relationship as in the third equation.

Similar to the surface grinding investigation, the validity of the model form for cylindrical plunge-grinding processes was tested against existing grinding force models for cylindrical plunge-grinding. The data were generated from existing models and used for fitting the generalized model form. High $R^2$ values obtained in the model fitting results showed that the generalized model form encompassed existing models very well, and hence could be used for a general class of cylindrical plunge-grinding processes.

The surface roughness model was constructed by modifying the model for surface grinding shown, but with the traverse effect removed because no traverse motion occurs in the cylindrical plunge-grinding process and the equivalent chip thickness term is again replaced. In addition to roughing and finishing stages, cylindrical plunge-grinding usually involves a spark-out stage. The change of surface roughness with the spark-out time can be modeled as an exponential function. Therefore, the surface roughness model is given as:

$$R_{a,0}=R_0 s_d^{r_1} a_d^{r_2}(\pi \cdot d_w v_1/v_s)^{r_3}[1+\exp(r_4 \cdot t_3)]$$

$$R_a=R_{a,0}(1+r_5 \cdot V'^{r_6}_w)$$

where $t_3$ is the spark-out time.

To represent time-varying characteristics in the surface roughness model, a power relationship was again assumed.

For the in-feed rate and in-feed model, previously proposed models were considered but deemed to be practically difficult to use because the grinding ratio model is coupled with the infeed rate model. Assuming that the amount of wheel wear during one grinding cycle is small in comparison to the radial penetration rate, the wheel wear can be neglected. Based on this, the grinding ratio model was decoupled from the infeed rate model, resulting in the following equations.

$$v_i=u_i-(u_i-v_{i-1})e^{-(t_i/\tau')}$$

$$q_i=u'_i t_i+\tau'(u_i-v_{i-1})(e^{-(t_i/\tau')}-1)$$

where the time constant $\tau$ is determined from experimental results.

The same grinding ratio model as in surface grinding was used after replacing the specific material removal rate term as follows:

$$G=G_1(\pi \cdot d_w v_1/v_s)^{-g}$$

The in-feed motion of a grinding wheel into the workpiece generates a spiral-shaped part. Ideally, the out-of-roundness of the workpiece corresponds to the spiral error or instantaneous wheel depth of cut. Therefore, the out-of-roundness is proportional to the instantaneous wheel depth of cut during spark-out represented by the following relationship.

$$r=r_0(\pi d_w v_3/v_w)$$

Though the out-of-roundness does not decrease to zero even with zero wheel depth of cut due to machine-related factors, this effect was not considered in the investigation.

Similar to the first investigation directed to surface grinding processes, three objectives for minimization of grinding cost, minimization of cycle time, and process design were considered in this investigation. The grinding cost per piece is given by the sum of machining cost, dressing cost, wheel consumption, and dresser cost as follows:

Cost=(grinding cost $)+(dressing cost $)+(wheel wear cost in grinding $)+(wheel wear cost in dressing $)+(dress cost $)

The objective function for calculating the cycle time included grinding time, dressing time, and wheel change time as follows:

$t_{cycle}$=(grinding time)+(dressing time)+(wheel change time)

The process design task found operating conditions to achieve desirable values of process conditions. Desired values for grinding power, grinding ratio, surface roughness, and out-of-roundness were achieved simultaneously for cylindrical plunge-grinding processes. The objective function was given as a weighted sum of normalized errors.

The optimization was subject to several constraints, including surface roughness, out-of-roundness, and size of the final part which were prescribed as follows:

$$R_a \le R_{max}$$

$$P \le P_{max}$$

$$r \le r_{max}$$

$$u_1 t_1+u_2 t_2=\Delta r$$

Different thermal constraints were also used. First, burning is permitted to occur during the roughing stage, but must removed during the finishing stage (Case I). Second, the grinding power is limited such that burning will not occur during any of the three stages of roughing, finishing and spark-out (Case II). Finally, a third scenario was investigated that did not impose any thermal constraint (Case III).

The burning threshold for specific grinding power was calculated using:

$$P'_b=u_0 \pi d_w v+B(\pi d_w d_{eq} v v_w)^{1/4}$$

where $u_0$ and B are dependent on the wheel and work material. Therefore, the constraint for the no-burn constraint of Case II is given as:

$P_b \le P_{max}$ for all stages

For Case I, the depth of burn was estimated and the burning constraint was given as:

$z_1 \le q_2$ and $P_{2,max} \le P_b$ where $z_1$ is the depth of burn and $q_2$ is the radial stock removal for the finishing stage.

GIGAS was then applied to the cycle time minimization problem of cylindrical plunge-grinding with a prefixed dressing interval for benchmarking, where the optimization problem was simplified and the wheel was assumed to be dressed per each part. Therefore, the optimization objective was to minimize only the grinding time for the three stages (roughing, finishing, spark-out) as follows:

$$\min t_{cycle} = t_1 + t_2 + t_3$$
$$= s_1/u_1 + s_2/u_2 + t_3$$

Figure 18:
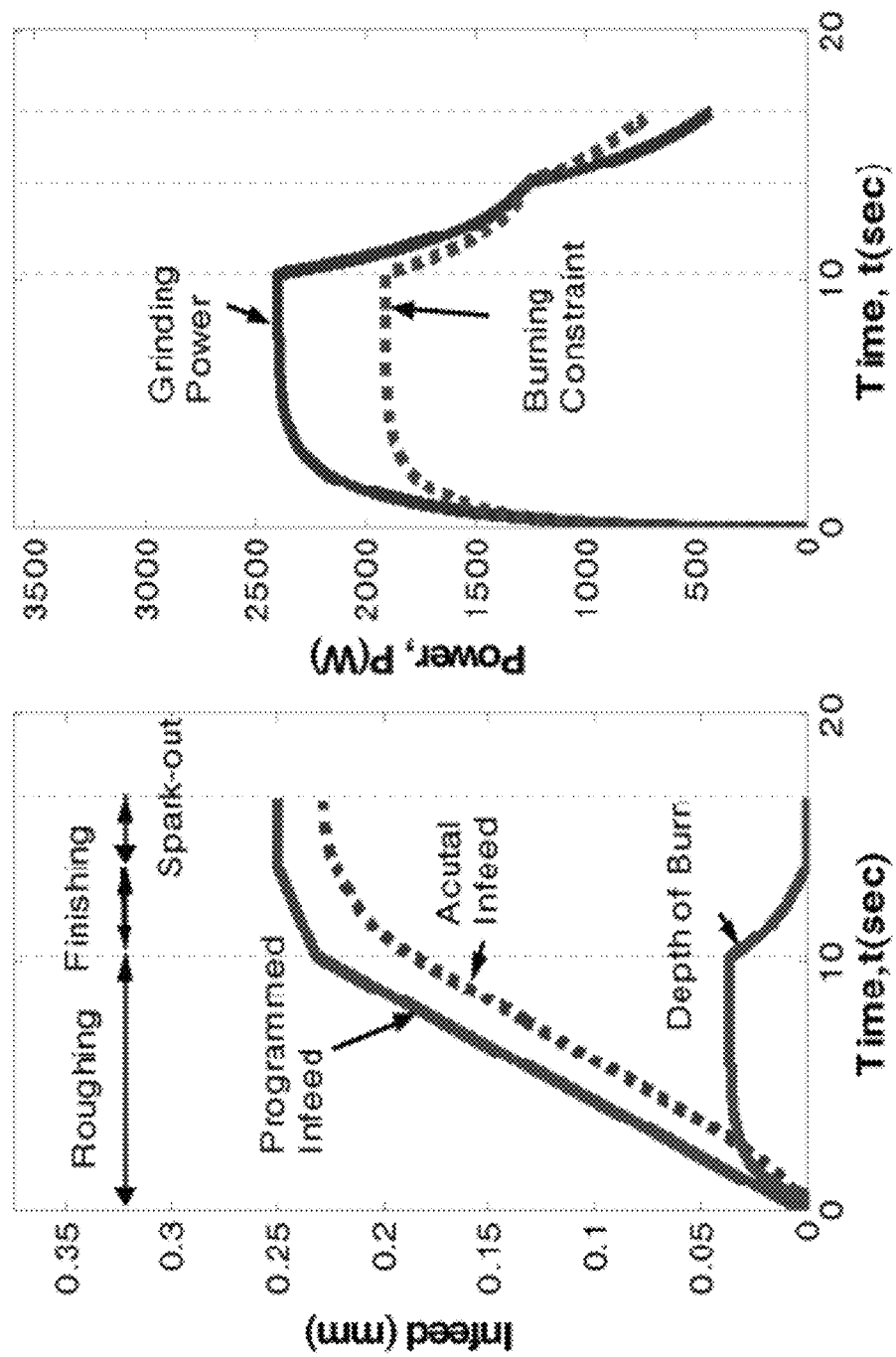
FIGS. 18, 19 and 20 plot simulation results obtained for the three case scenarios examined by the second investigation.

The grinding process was simulated based on the results of the optimization approach. FIG. 18 is illustrative of results obtained for Case I of the burning constraint, in which the actual in-feed deviates from the programmed in-feed due to the wheel wear and the elastic deflection. As observed from the depth of burn and grinding power curves, the simulation results in the occurrence of burning in the roughing cycle, but the burned layer is removed in the finishing cycle as expected.

Only a subset of independent variables was considered and the remainder were fixed. The variables used for this optimization entailed:

$u_1$, $u_2$ (mm/s)=programmed in-feed velocities
$t_1$, $t_2$, $t_3$ (s)=grinding time at each stage
$s_d$ (mm)=dressing lead The dressing depth and wheel speed were fixed, and the work speed was excluded from the variables based on the argument that peripheral work velocity has a secondary influence on cycle time. The process constraints considered to obtain optimal conditions included thermal damage, surface roughness, grinding power, out-of-roundness, and size of the final part as well as operating ranges of design variables.

Figure 19:
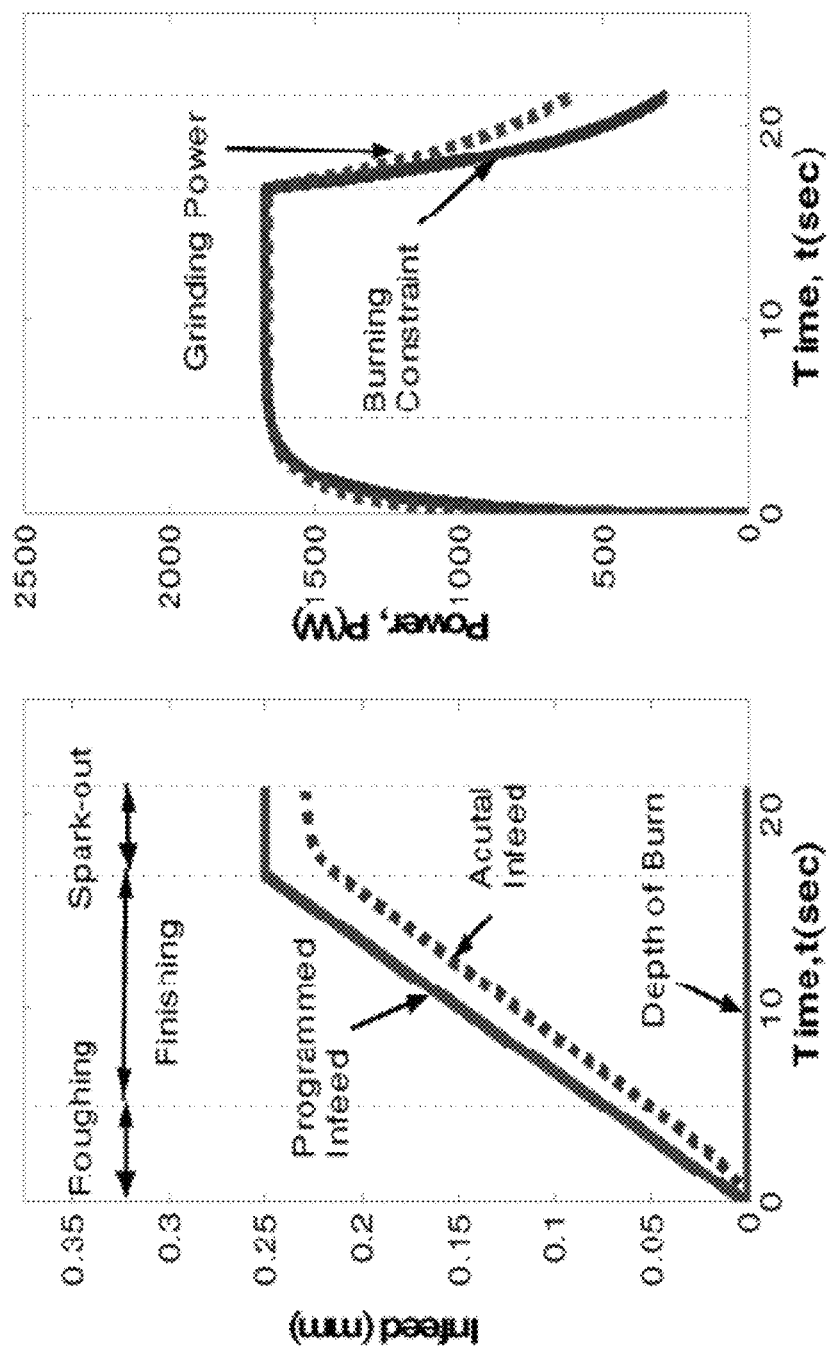
Figure 20:
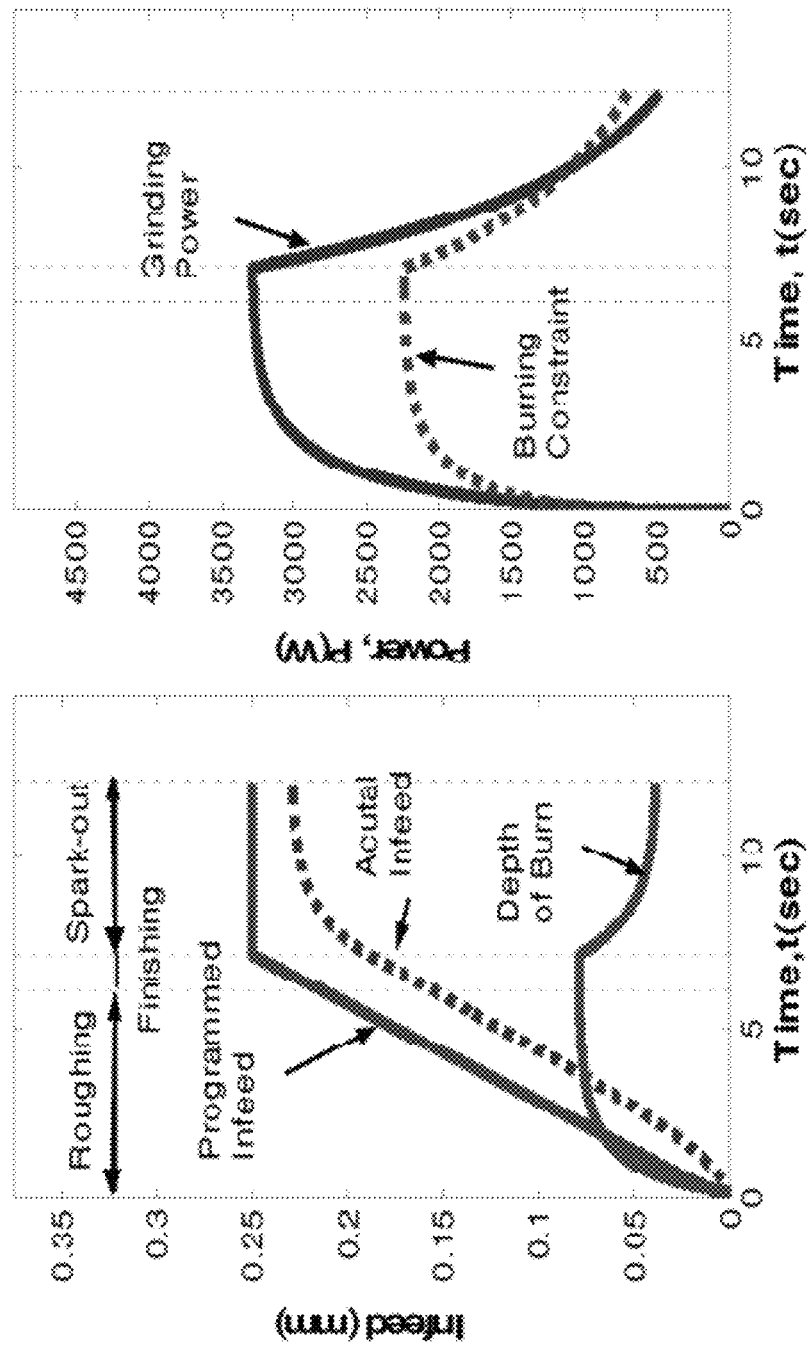

As noted above, based on the thermal constraints used, three cases were considered: Case I—Burning is permitted but must be removed during finishing; Case II—No burning is permitted; and Case III—No thermal constraints. Grinding conditions are summarized in Table 6 of FIG. 14. After running optimization, the values of design variables were calculated and the corresponding process conditions were estimated, as set forth in Tables 7 and 8 (FIGS. 15 and 16). Case II, in which the no-burn constraint was used, suggested more conservative values while the maximum values of in-feed rate within the operating rate were taken for Case III. As a result, Table 9 of FIG. 17 evidences that Cases II and III were predicted to have the longest and shortest cycle times, respectively. FIG. 19 plots the data for Case II, whose no-burn constraint required that burning does not occur in any stage and the grinding power is always less than the corresponding burning power. This simulation gave the longest cycle time of 21.47 s to avoid burning. Even though Case III (FIG. 20), where burning is not considered at all, gave the shortest cycle time of 12.22 s, the part would have a burnt layer even after the spark-out stage. Therefore, Case III represented an unacceptable result, where a constraint was violated.

Minimization of cycle time and grinding cost with unfixed dressing interval

More general cases of minimizing cycle time and grinding costs were also considered where the wheel was assumed to be periodically dressed based on process condition constraints after grinding a number of workpieces. The dressing interval was defined as the number of parts between redressing, which would be mainly determined by degradation of surface roughness and/or higher grinding power due to the wheel wear. The continuous design variables were:

$u_1$, $u_2$ (mm/s)=infeed velocities
$s_1$, $s_2$ (mm)=size switching positions between stages
$t_3$ (s)=spark-out time
$s_d$(mm)=dressing lead Dressing interval, $N_d$, was a discrete design variable. The optimization results evidenced that the optimization approach of this invention was able to achieve a lower grinding cost at the expense of a longer cycle time compared with the case of cycle time minimization.

On the basis of the above, a knowledge-based optimization system that uses analytical models, empirical data, and heuristic rules was concluded to be applicable to various grinding applications with different machines, grinding wheels and work materials by adopting generalized process models and the ES-based generalized optimization approach. The generalized models can reduce the time and effort for model building since the model structure can be used for various wheel-work combinations. The proposed fuzzy and neural network-based models (FBFN and RBFN) were shown to be capable of incorporating empirical data and heuristic rules for modeling in addition to analytical equations. From the case studies, it was shown that the optimization approach was capable of handling non-linear optimization problems with mixed-discrete variables by considering a discrete design variable and would be applicable to a wide range of grinding optimization.

In an implementation of a manufacturing process utilizing a system capable of performing the optimization approach of this invention, the optimization approach would typically involve initially identifying at least one processing objective of a grinding operation (or some other complex manufacturing process) that is to be performed on a subject, for example, a component formed of a metallic material. As nonlimiting examples, the processing objective(s) may include the cost and/or cycle time of the manufacturing process, or one or more desired properties of the component produced by the manufacturing process, for example, surface finish (roughness), residual stress, out-of-roundness, etc.

As represented in FIGS. 1 through 5, such a system preferably includes a graphical user interface (GUI), a process module, and an optimization module. As represented in FIG. 4, the optimization module preferably includes an optimization engine that employs an ES algorithm, preferably of the type represented in FIG. 5. As also represented in FIGS. 1 and 4, the process module preferably makes use of a training module, an empirical relationships database, an analytical equations database, a heuristic knowledge database, and a process models database. The process module may also include a machine database containing operational information of the apparatus. The output of the optimization module is then used to control an apparatus adapted to perform the complex manufacturing process, for example, a surface grinding or cylindrical plunge grinding operation as described above for the investigations, though other grinding operations are also within the scope of the invention, for example, cylindrical traverse grinding, centerless grinding, and internal grinding operations.

The GUI is used to input into the system one or more processing variables and one or more constraints associated with the processing objective(s) of the manufacturing process. Nonlimiting examples of suitable processing variables include the particular type of grinding operation, operating parameters of a particular grinding machine, and the composition of the component. The apparatus is then operated to perform a trial of the manufacturing process on a specimen of the component using the one or more processing variables input into the system. Following completion of the trial, the processing variables used in the trial and empirical data from the trial are then inputted with the GUI into the training module, and the training module generates at least one empirical relationship between each processing variable used in the trial and the empirical data from the trial. The empirical relationships are then stored in the empirical relationships database, and the process module is used to generate a process model that takes into consideration heuristic knowledge of the manufacturing process stored in the heuristic knowledge database, the empirical relationship(s) stored in the empirical relationships database, and optionally any analytical equations that are stored in the analytical equations database and relate to the manufacturing process. Once the process model is stored in the process models database, the optimization module can be operated to use the process model in a manner that preferably optimizes the manufacturing process by adjusting the one or more processing variables and inputting the adjusted processing variables into the apparatus. Thereafter, the apparatus is again operated to perform the manufacturing process on another specimen of the component, with the expectation that the one or more processing objectives of the manufacturing process and the component will be met. If necessary, empirical data obtained with the additional manufacturing process can be inputted into the training module to generate further empirical relationships from which the process module can generate a refined process model.

While the invention is disclosed and described herein in terms of specific embodiments, it will be apparent that other forms could be adopted by one skilled in the art. Accordingly, it should be understood that the invention is not limited to the specific embodiments described and illustrated in the detailed descriptions. It should also be understood that the phraseology and terminology employed above are for the purpose of disclosing the embodiments, and do not necessarily serve as limitations to the scope of the invention. Instead, the scope of the invention is to be limited only by the following claims.

The invention claimed is:

1. A method of optimizing a complex manufacturing process performed on a subject to achieve a plurality of processing objectives, the method comprising the steps of:
    providing a system comprising a graphical user interface, a process module in communication with the graphical user interface, and an optimization module in communication with the process module, the process module comprising a training module, an empirical relationships database, an analytical equations database, a heuristic knowledge database, and a process models database, the optimization module comprising an optimization engine, the system controlling an apparatus adapted to perform a grinding operation;
    using the graphical user interface to input into the system at least one processing variable and constraints for the plurality of processing objectives of the grinding operation, the at least one processing variable comprising at least one parameter of the grinding operation, operating parameters of the apparatus for performing the grinding operation, and material of the subject, the plurality of processing objectives comprising at least one of cost of the grinding operation, cycle time of the grinding operation, and at least one desired property of the subject following the grinding operation, the at least one desired property comprising at least one of surface roughness, residual stress, and out-of-roundness of the subject;
    operating the apparatus to perform a trial of the grinding operation on a specimen of the subject using the at least one processing variable;
    inputting the at least one processing variable used in the trial and empirical data from the trial into the training module, the training module generating at least one empirical relationship between the at least one processing variable used in the trial and the empirical data from the trial and storing the at least one empirical relationship in the empirical relationships database;
    using the process module to generate a process model that takes into consideration heuristic knowledge of the grinding operation stored in the heuristic knowledge database, the at least one empirical relationship stored in the empirical relationships database, and optionally analytical equations stored in the analytical equations database and relating to the grinding operation;
    storing the process model in the process models database; and
    operating the optimization module by which the process model is employed to optimize the grinding operation by adjusting the at least one processing variable and inputting the adjusted processing variable into the apparatus before again operating the apparatus to perform the grinding operation and achieve the plurality of processing objectives.

2. The method according to claim 1, wherein the grinding operation is chosen from the group consisting of surface grinding, cylindrical plunge grinding, cylindrical traverse grinding, centerless grinding, and internal grinding.

3. The method according to claim 1, wherein the operating parameters of the apparatus include at least one of grinding power, grinding ratio, and thermal constraints of the grinding operation.

4. The method according to claim 1, wherein the optimization engine employs an evolutionary strategies-based generalized optimization approach.

5. The method according to claim 1, wherein the training module employs an RBFN model to generate the at least one empirical relationship from the at least one processing variable and the empirical data.

6. The method according to claim 1, wherein the process module employs empirical models and an FBFN or RBFN model to generate the empirical models from the heuristic knowledge stored in the heuristic knowledge database and the at least one empirical relationship stored in the empirical relationships database.

7. The method according to claim 1, wherein the process module further comprises a machine database containing operational information of the apparatus.

8. A system for optimizing a grinding operation performed by an apparatus on a subject to achieve a plurality of processing objectives, the system comprising:
    a graphical user interface that inputs into the system at least one processing variable and constraints for the plurality of processing objectives of the grinding operation, the at least one processing variable comprising at least one parameter of the grinding operation, operating parameters of the apparatus for performing the grinding operation, and material of the subject, the plurality of processing objectives comprising at least one of cost of the grinding operation, cycle time of the grinding operation, and at least one desired property of the subject following the grinding operation, the at least one desired property comprising at least one of surface roughness, residual stress, and out-of-roundness of the subject;
    a process module in communication with the graphical user interface,
    the process module comprising a training module, an empirical relationships database, an analytical equations database, a heuristic knowledge database, and a process models database, the training module being operable to generate at least one empirical relationship between the at least one processing variable and empirical data and store the at least one empirical relationship in the empirical relationships database, the process module being operable to generate a process model that takes into consideration heuristic knowledge of the grinding operation stored in the heuristic knowledge database, the at least one empirical relationship stored in the empirical relationships database, and optionally analytical equations stored in the analytical equations database and relating to the grinding operation, the process module being further operable to store the process model in the process models database; and an optimization module in communication with the process module, the optimization module comprising an optimization engine and being operable to employ the process model to optimize the grinding operation and achieve the plurality of processing objectives by adjusting the at least one processing variable and inputting the adjusted processing variable into the apparatus.

9. A system for optimizing a grinding operation performed on a subject to achieve a plurality of processing objectives, the system comprising:

means for inputting constraints for the plurality of processing objectives into an apparatus adapted to perform the grinding operation;

means for inputting into the apparatus at least one processing variable of the grinding operation, the at least one processing variable comprising at least one parameter of the grinding operation, operating parameters of the apparatus for performing the grinding operation, and material of the subject, the plurality of processing objectives comprising at least one of cost of the grinding operation, cycle time of the grinding operation, and at least one desired property of the subject following the grinding operation, the at least one desired property comprising at least one of surface roughness, residual stress, force, power, grinding ratio, and out-of-roundness of the subject;

means for operating the apparatus to perform a trial of the grinding operation on a specimen of the subject using the at least one processing variable;

means for inputting the at least one processing variable used in the trial and empirical data from the trial into a training module, the training module generating at least one empirical relationship between the at least one processing variable used in the trial and the empirical data from the trial, the training module storing the at least one empirical relationship in a empirical relationships database;

a process model that takes into consideration analytical equations relating to the grinding operation, heuristic knowledge of the grinding operation stored in a heuristic knowledge database, and the at least one empirical relationship from the training module; and an optimization engine by which the process model is employed to optimize the grinding operation by adjusting the at least one processing variable and inputting the adjusted processing variable into the apparatus before again operating the apparatus to perform the grinding operation and achieve the plurality of processing objectives.

10. The system according to claim 9, wherein the grinding operation is chosen from the group consisting of surface grinding, cylindrical plunge grinding, cylindrical traverse grinding, centerless grinding, and internal grinding.

11. The system according to claim 9, wherein the operating parameters of the apparatus include at least one of grinding power, grinding ratio, and thermal constraints of the grinding operation.

12. The system according to claim 9, wherein the means for inputting the plurality of processing objectives and the at least one processing variable are components of a graphical user interface.

13. The system according to claim 9, wherein the optimization engine employs an extended evolutionary strategies-based generalized optimization approach.

14. The system according to claim 9, wherein the training module employs an RBFN model to generate the at least one empirical relationship from the at least one processing variable and the empirical data.

15. The system according to claim 9, wherein the process module employs empirical models and an FBFN or RBFN model to generate the empirical models from the heuristic knowledge stored in the heuristic knowledge database and the at least one empirical relationship stored in the empirical relationships database.

16. The system according to claim 9, wherein the process module further comprises a machine database containing operational information of the apparatus.

* * * * *